United States Patent [19]

Edmonds et al.

[11] Patent Number: 4,775,092
[45] Date of Patent: Oct. 4, 1988

[54] METHOD AND APPARATUS FOR BUILDING A WORKPIECE BY DEPOSIT WELDING

[75] Inventors: David P. Edmonds, Jackson, Mo.; Michael D. McAninch, Alliance, Ohio

[73] Assignee: The Babcock & Wilcox Company, New Orleans, La.

[21] Appl. No.: 115,131

[22] Filed: Oct. 30, 1987

[51] Int. Cl.⁴ .......................... B23K 9/32; B23K 9/04; B23K 9/225
[52] U.S. Cl. .................... 228/222; 228/242; 228/50; 228/46; 228/25; 164/497; 164/509; 219/76.11
[58] Field of Search ................... 228/222, 242, 50, 46, 228/48, 59, 215, 25; 164/495, 497, 509; 219/76.11, 76.12

[56] References Cited

U.S. PATENT DOCUMENTS

| 3,785,429 | 1/1974 | Ujiie | 164/509 |
| 4,103,142 | 7/1978 | Cartwright | 228/50 |
| 4,621,762 | 11/1986 | Bronowski | 228/222 |

FOREIGN PATENT DOCUMENTS 4683  3/1979  Japan ................................. 228/222

Primary Examiner—Nicholas P. Godici
Assistant Examiner—Samuel M. Heinrich
Attorney, Agent, or Firm—Vytas R. Matas; Robert J. Edwards; Daniel S. Kalka

[57] ABSTRACT

A method and apparatus for building an axially symmetrical workpiece of desired geometry by deposit welding which uses a translatable welding head for depositing molten weld material and a rotatable, reusable shoe which translates with the welding head. The rotatable, reusable shoe forms, supports and cools the deposited molten weld material puddle while the weld material is solidifying thereby eliminating the need for a conventional preform.

16 Claims, 2 Drawing Sheets

METHOD AND APPARATUS FOR BUILDING A WORKPIECE BY DEPOSIT WELDING

FIELD AND BACKGROUND OF THE INVENTION

Shape Melting is a process whereby structural components are manufactured by depositing weld material layer-upon-layer until the desired geometry is achieved. This process offers the advantage of delivering a near-net-shape product which can be produced quickly and economically using both ferrous and non-ferrous materials.

U.S. Pat. No. 2,299,747 to Harter is directed in part to a method for forming stuctures wholly of fusion deposited weld metal by the arc process in successive intersecting fusion beads along a non-adherent base. A similar method is described in U.S. Pat. No. 2,912,562 to Donovan which disclosure is directed to reconditioning cylinder liners for diesel engines. The concept of forming a cylinder made up solely of welded material progressively desposited in molten form is disclosed in U.S. Pat. No. 3,558,856 to Ujiie. Million, et al, U.S. Pat. No. 4,517,434 relates to deposit welding to make a tube bend built up by a plurality of weld sections. Additionally known from U.S. Pat. No. 4,621,762 to Bronowski is the buildup of a workpiece by deposit welding using form shoes cooled by water. Along the same general lines as Ujiie, U.S. Pat. No. 4,671,448 to Million, et al describes a method of forming an element having a symmetrically curved surface by means of weld buildup and rotation of the work.

Automation and computer control can be integral parts of the Shape Melting process. The use of automation allows for maximum flexibility of the production station. This flexibility permits any number of different products to be manufactured without extensive retooling. Retooling in this case would be, for the most part, changing the controlling software which dictates the sequence, welding parameters, and position of welds necessary to achieve the desired final product.

Almost every facet of Shape Melting can involve computer control. In the incipient stages of a project, design aspects would be subject to computer analysis. The results of these analyses would then be incorporated into the functions which control automation.

Implicit in the use of the above controls is the ability to deliver a final product with tailored mechanical, corrosion, and physical properties. This comes about because these properties are strongly tied to the interrelated functions of weld heat input, cooling rate, bead size, bead shape, bead sequence, and bead position. If, in addition to the above variables, one also permits controlled composition variation throughout the product, it is possible, if appropriate control is exercised, for the product to have the desired combination of strength, toughness, hardness, or corrosion resistance at critical points in the product.

Weld build-up operations like Shape Melting require a preform which is generally a machined piece of metal onto which the first layer of the build-up is deposited. It is termed a "preform" because its formed or machined shape reflects an intended final shape of the build-up.

A preform serves as the support for tee molten as-deposited weld metal, as the conduit for conduction cooling of the freshly deposited weld metal, as the means for restraining weld contraction stresses thereby limiting distortion of the build-up, and as the general cross-sectional shape for the weld build-up, e.g. a cylindrical build-up would require a cylinder as the starting preform.

Virtually all weld build-ups require some form of preform for any or all of the purposes stated above. In almost every instance, the surface of the conventional preform is melted by the heat of the welding arc. This melting of the surface results in a detrimental bonding of the preform to the weld build-up. Further, unless the preform has the same composition as the weld filler material, surface melting of the preform will result in the initial layers of the build-up having a composition which includes some melted preform material.

If the aforementioned composition variation is objectionable, it will be necessary to machine away the preform and as many layers of the build-up as necessary to achieve an acceptable weld metal composition throughout. This loss of material and increased production time negatively impacts the economy of Shape Melting. As was mentioned earlier, another purpose associated with the use of a preform, is that the preform usually must be machined to an initial desired geometry. This implies expenses both in materials and machining time prior to shape melting. Thus, in summary, if the need for a preform can be eliminated, the costs associated with both the initial and final stages of Shape Melting manufacturing can be reduced.

SUMMARY OF THE INVENTION

The invention described herein is a rotating, reusable shoe apparatus, and method of using same, which eliminates the need for a conventional preform in the creation of workpieces made entirely from deposited weld metal. The rotating, reusable shoe provides the underlying form, necessary puddle support, and cooling for the weld metal as it is deposited and solidifies. Due to features in the shoe's design, its surface is not melted during welding, never bonds to the workpiece, and does not adversely affect the composition of the as-deposited weld metal. Therefore, the use of this device allows the workpiece to achieve the desired shape without using the added expense associated with a conventional preform.

Accordingly, one aspect of the present invention is drawn to an apparatus for building an axially symmetrical workpiece by deposit welding. The apparatus comprises a welding head translatable along the axis of the workpiece for depositing molten weld material; a rotatable, reusable shoe held in friction contact with the workpiece for forming, supporting and cooling the molten weld metal deposited directly on the surface thereof; means for rotating the workpiece and, by friction, the shoe held in contact therewith, as the welding head deposits molten weld material on the surface of the shoe; and means for translating the shoe and the welding head together for continuously providing a new, fresh region of the shoe surface underneath the welding head to consistently cool the molten weld material as it is deposited.

Another aspect of the present invention is drawn to an apparatus for building an axially symmetrical workpiece by deposit welding having the above features which further provides means for varying the tilt angle between the shoe surface and the axis of the workpiece so as to vary the geometry of the workpiece, thus providing an apparatus having horizontal, vertical, and rotational flexibility which would allow the production of various geometry workpieces using a single shoe design.

Yet another aspect of the present invention is drawn to a method for building an axially symmetrical workpiece by deposit welding, comprising the steps of: depositing molten weld material using a welding head translatable along the axis of the workpiece onto a surface of a rotatable, reusable shoe held in friction contact with the workpiece; rotating the workpiece, and, by friction, the shoe held in contact therewith, during the deposition of the molten weld material to the surface of the shoe; and translating the shoe and the welding head together to continuously provide a new, fresh region of the shoe surface underneath the welding head to consistently cool the molten weld material as it is deposited.

The advantages of the present invention are thus immediately apparent. By providing a reusable shoe that eliminates the need for a consumable preform, the production costs associated with machining a conventional preform to a desired initial geometry for each workpiece to be manufactured are greatly reduced. Similarly, by preventing the shoe from melting in the welding arc, as is the situation when a conventional, disposable preform is used, no bond forms between the shoe and the deposited weld metal that forms the workpiece, thus eliminating contamination of the layers of the as-deposited weld metal and the subsequent machining usually required.

The various features of novelty which characterize the invention are pointed out with particularity in the claims annexed to and forming a part of this disclosure. For a better understanding of the invention, and the operating advantages attained by its use, reference is made to the accompanying drawings and descriptive matter in which a preferred embodiment of the invention is illustrated.

DESCRIPTION OF THE PREFERRED EMBODIMENT

Figure 1:
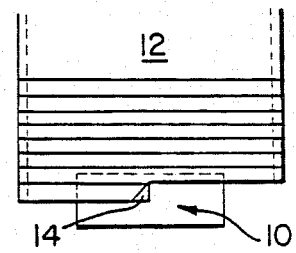
FIG. 1 is a top view of the shape welding apparatus of the present invention.
Figure 2:
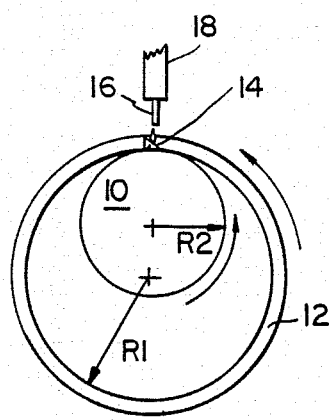
FIG. 2 is an end view of FIG. 1, showing the shape welding apparatus of the present invention.
Figure 3:
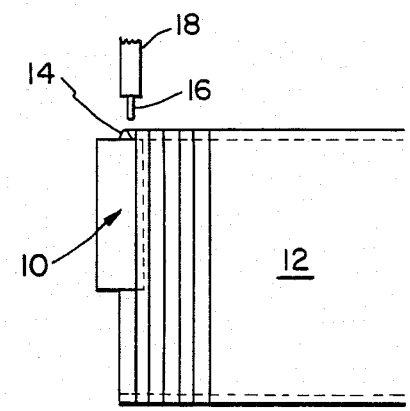
FIG. 3 is a side view of FIG. 2, showing the shape welding apparatus of the present invention.

Referring to the Figures generally, wherein like numerals designate the same element throughout the several drawings, and to FIGS. 1, 2 and 3 in particular, one aspect of the present invention is directed to a cylindrical shoe 10 which provides the cooling, shaping, and support functions of a preform without being consumed. In operation, the shoe 10 is held in close contact with the workpiece 12. The contact point 14 coincides with the point of weld metal deposition. In order to deposit metal, the arc is drawn between the consumable wire 16 and the edge of the existing workpiece 12. When the initial weld metal is deposited, metal deposition occurs on the edge of disposable metal starting stock. The shoe 10 is electrically isolated from the welding circuit, so that the arc is not drawn to it. The arc simultaneously melts a small region at the edge of the workpiece 12 and begins deposition of molten droplets 14 of the consumable wire 16. Contact of the shoe 10 under the deposition region is controlled in such a way as to support all the molten material which is generated and to provide a means to aid in the cooling of the hot metal. In this way, the surface of the shoe 10 defines the internal surface of the Shape Melted product.

The shoe 10, as depicted in FIGS. 1, 2 and 3, is designed to be used in the build-up of axially symmetrical components. For this function, it takes the form of a cylinder or wheel whose external radius is less than the internal radius of the workpiece 12. For a given application there is a lower and upper limit to the allowable shoe radius. The lower limit radius is defined by the ability of the shoe 10 to support and control the shape of the weld puddle. The upper limit radius is defined by the inside diameter of the component being fabricated.

In application, the shoe 10 is permitted to rotate freely. Rotation of the shoe 10 is driven by friction contact with the workpiece 12. Contact between the shoe 10 and the workpiece 12 is maintained by the adjustable vertical position of the cantilevered shoe 10. Mechanical rotation of the workpiece 12 drives the rotation of the shoe.

The welding head 18 is translated along the axis of the workpiece 12. This combination of mechanical rotation and weld head translation continuously provides a new region for deposition under the welding head 18. In this way, material is deposited in a helical or stepped fashion along the axis of the workpiece 12. In order to present a consistent shoe surface under the deposited material, the shoe 10 must be translated in conjunction with the welding head 18. The previously mentioned rotation of the shoe 10 is desired so that a fresh cooler shoe surface is continuously available to cool the newly deposited material 14. This continuous rotation makes it less likely that the shoe 10 will become hot enough in a localized area to melt and be consumed in the welding arc. Alternatively, rotation of the shoe 10 could be provided by an independent drive means (not shown) to insure constant and steady rotation during the application of the deposited weld metal to the workpiece 12.

Figure 4:
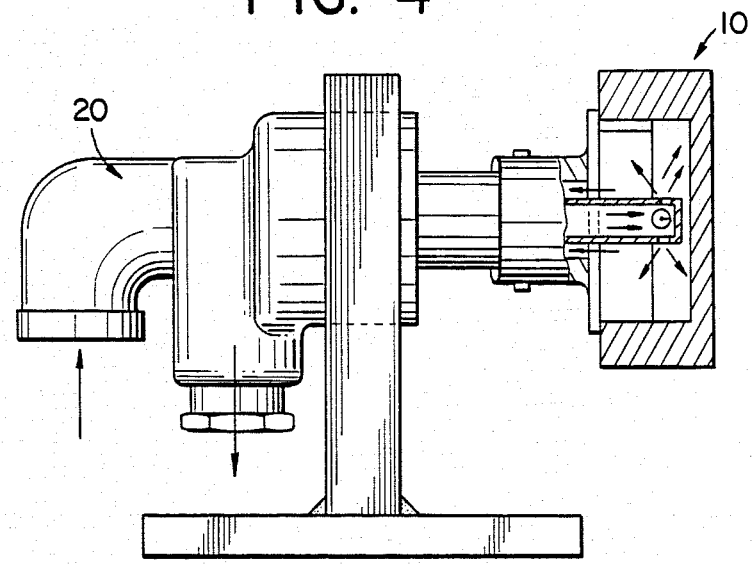
FIG. 4 is an illustration of a fluid cooled shoe, partly in section, according to the present invention shown mounted on a rotary coupling.

To provide further assurance that the shoe 10 will not melt, it is manufactured from a high conductivity material, e.g. copper. Additionally, the shoe is hollow in design, as illustrated in FIG. 4, to provide an access for internal cooling using a fluid. This cooling of the shoe is accomplished by continuously renewed cooling fluid which is circulated through the shoe with the aid of a rotary coupling mechanism 20. A suficiently high flow rate of cooling fluid is maintained to hold the shoe 10 at a consistently low temperature, thereby providing the dual benefits of providing a means to cool the deposited metal 14 and further minimizing the possibility of melting the shoe 10.

Figure 5:
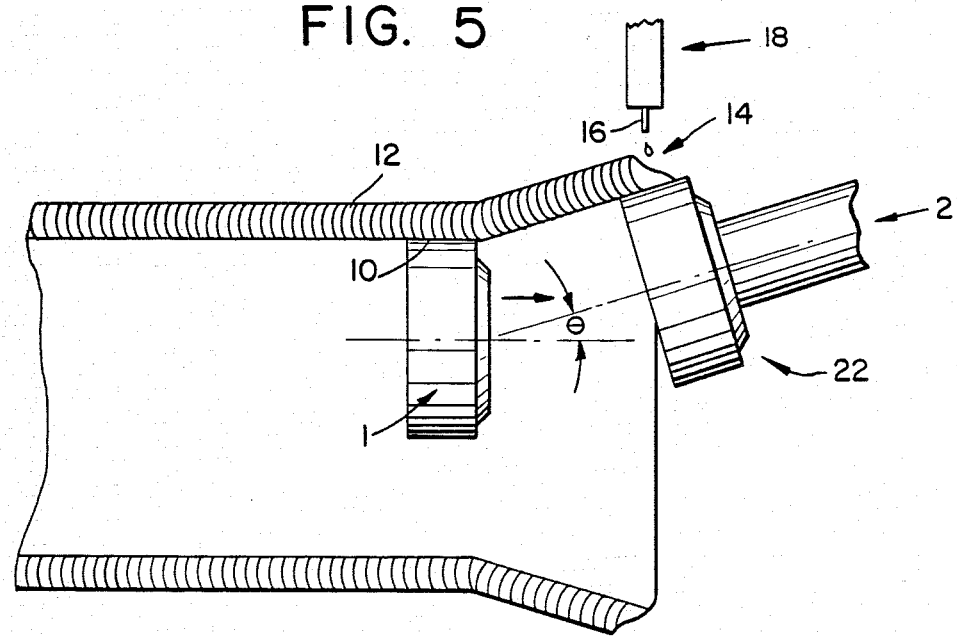
FIG. 5 is an illustration of a variable tilt angle of the shoe so as to achieve a variable workpiece geometry.

The cross section of the resulting workpiece 12 can be controlled by controlling the angle between shoe surface 10 and the workpiece 12. Referring to FIG. 5, if it is desired to vary the internal diameter of the workpiece 12, the desired result could be accomplished by tilting the shoe 10 to achieve the new desired geometry as achieved for example by tilted shoe 22. Thus, an additional mechanism is provided to tilt the shoe 10 to any desired angle while maintaining rotation, translation, and internal cooling capabilities. This same shoe tilting capability can also be used to accommodate and correct for changes in the product-geometry due to shrinkage strains.

While a specific embodiment of the invention has been shown and described in detail to illustrate the application of the principles of the invention, certain modifications and improvements will occur to those skilled in the art upon reading the foregoing description. It is thus understood that all such modifications and improvements have been deleted herein for the sake of conciseness and readability but are properly within the scope of the following claims.

We claim:

1. An apparatus for building an axially symmetrical workpiece by deposit welding, comprising:
    a welding head translatable along the axis of the workpiece for depositing molten weld material;
    a rotatable, reusable shoe held in friction contact with the workpiece for forming, supporting and cooling the molten weld material deposited directly on the surface thereof;
    means for rotating the workpiece and, by friction, the shoe held in contact therewith, as the welding head deposits molten weld material on the surface of the shoe; and
    means for translating the shoe and the welding head together for continuously providing a new, fresh region of the shoe surface to consistently cool the molten weld material as it is deposited.

2. An apparatus according to claim 1 wherein the rotatable, reusable shoe is manufactured from a high conductivity material.

3. An apparatus according to claim 2 wherein the high conductivity material is copper.

4. An apparatus according to claim 1 wherein the rotatable, reusable shoe is hollow.

5. An apparatus according to claim 4 further including means for cooling the hollow shoe by circulating a cooling fluid therethrough so as to consistently cool the deposited molten weld material and to prevent melting of the shoe.

6. An apparatus according to claim 5, wherein the shoe is electrically isolated from the welding head so that the welding arc is not drawn to the shoe.

7. An apparatus according to claim 1 wherein the axially symmetrical workpiece built up by deposit welding is hollow having an internal radius R1.

8. An apparatus according to claim 7 wherein the rotatable, reusable shoe is cylindrical and has an external radius R2, where R2 is less than or equal to R1.

9. An apparatus according to claim 8 wherein the external radius R2 of the shoe is no less than a lower limit radius defined by the ability of the shoe to support and control the shape of the deposited molten weld material puddle.

10. An apparatus according to claim 1 further including means for varying the tilt angle between the shoe surface and the axis of the workpiece so as to vary the geometry of the workpiece.

11. An apparatus for building an axially symmetrical workpiece by deposit welding, comprising:
    a welding head translatable along the axis of the workpiece for depositing molten weld material;
    a rotatable, reusable shoe held in friction contact with the workpiece for forming, supporting and cooling the molten weld material deposited directly on the surface thereof;
    means for rotating the workpiece and, by friction, the shoe held in contact therewith, as the welding head deposits molten weld material on the surface of the shoe;
    means for varying the tilt angle between the shoe surface and the axis of the workpiece so as to vary the geometry of the workpiece; and
    means for translating the shoe and the welding head together for continuously providing a new, fresh region of the shoe surface to consistently cool the molten weld material as it is deposited.

12. A method for building an axially symmetrical workpiece by deposit welding, comprising of steps of:
    depositing molten weld material using a welding head translatable along the axis of the workpiece onto a surface of a rotatable, reusable shoe held in friction contact with the workpiece;
    rotating the workpiece, and, by friction, the shoe held in contact therewith, during the deposition of the molten weld material to the surface of the shoe; and
    translating the shoe and the welding head together to continuously provide a new, fresh region of the shoe surface underneath the welding head to consistently cool the molten weld material as it is deposited.

13. A method according to claim 12 further including the step of cooling the shoe by circulating a cooling fluid therethrough to consistently cool the deposited molten weld material and to prevent melting of the shoe.

14. A method according to claim 13 further including the step of electrically isolating the shoe from the welding head so that the welding arc is not drawn to the shoe.

15. A method according to claim 14 further including the step of independently rotating the shoe, in addition to rotating the workpiece, to insure constant and steady rotation of the shoe during deposition of the molten weld material to the surface of the shoe.

16. A method according to claim 15 further including the step of varying the tilt angle between the shoe surface and the workpiece during deposition of the molten weld material to vary the geometry of the workpiece.

* * * * *